(12) United States Patent
Hinz et al.

(10) Patent No.: US 6,796,619 B1
(45) Date of Patent: Sep. 28, 2004

(54) HYDRAULIC BRAKE SYSTEM WITH A PRECHARGING DEVICE

(75) Inventors: Axel Hinz, Neu-Anspach (DE); Erhard Beck, Weilburg (DE); Michael Jung, Limburg (DE); Hans Dieter Reinartz, Frankfurt am Main (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/214,394

(22) PCT Filed: Jun. 24, 1997

(86) PCT No.: PCT/EP97/03295

§ 371 (c)(1),
(2), (4) Date: Jul. 7, 1999

(87) PCT Pub. No.: WO98/00322

PCT Pub. Date: Jan. 8, 1998

(30) Foreign Application Priority Data

Jul. 1, 1996 (DE) .......................................... 196 26 304

(51) Int. Cl.[7] .................................................. B60T 8/36
(52) U.S. Cl. ................................... 303/119.2; 303/116.1
(58) Field of Search ........................... 303/119.2, 119.3, 303/116.1, 116.2

(56) References Cited

U.S. PATENT DOCUMENTS

| | | | | |
|---|---|---|---|---|
| 2,914,086 A | * | 11/1959 | Beller ......................... | 137/544 |
| 5,180,216 A | * | 1/1993 | Kirstein ....................... | 303/10 |
| 5,639,061 A | * | 6/1997 | Krauter et al. ............. | 303/119.2 |
| 5,641,211 A | * | 6/1997 | Feigel et al. ................ | 303/119.2 |
| 5,683,150 A | * | 11/1997 | Burgdorf et al. ........... | 303/119.2 |
| 5,704,587 A | * | 1/1998 | Kuromitsu et al. ........ | 303/119.2 |
| 5,735,582 A | * | 4/1998 | Eith et al. ................... | 303/119.2 |
| 5,810,330 A | * | 9/1998 | Eith et al. ................... | 303/119.2 |
| 5,865,213 A | * | 2/1999 | Scheffel et al. ............ | 303/119.2 |

FOREIGN PATENT DOCUMENTS

| | | | | |
|---|---|---|---|---|
| DE | 33 37 545 | | 4/1985 | |
| DE | 40 25 859 | | 2/1992 | |
| DE | 41 28 091 | | 2/1993 | |
| DE | 43 29 140 | | 8/1993 | |
| DE | 44 15 651 | | 5/1994 | |
| DE | 44 27 379 | | 8/1994 | |
| DE | 44 09 911 | | 9/1995 | |
| DE | 44 39 904 | | 5/1996 | |
| DE | 195 41 913 | | 5/1997 | |
| DE | 40 25 859 | | 2/1999 | |
| EP | 460 408 | | 12/1991 | |
| EP | 606 840 | | 7/1994 | |
| FR | 2275715 A | * | 2/1976 | ............. F16K/1/44 |
| JP | 5817275 A | * | 2/1983 | |
| WO | WO 96/02409 | | 2/1996 | |
| WO | WO 96/10507 | | 4/1996 | |
| WO | WO 96/14228 | | 5/1996 | |
| WO | WO 96/15926 | | 5/1996 | |
| WO | 96/15926 | * | 5/1996 | ............. 303/119.2 |
| WO | WO 97/06040 | | 2/1997 | |
| WO | 97/06040 | * | 2/1997 | ............. 303/119.2 |

* cited by examiner

Primary Examiner—Robert A. Siconolfi
(74) Attorney, Agent, or Firm—Rader, Fishman & Grauer PLLC

(57) ABSTRACT

The return pumps of brake systems with a precharging device are greatly stressed by the precharging pressure and subjected to premature wear. Significant leakage occurs in the long run which will damage the pump motors in the worst case. This is prevented by controlling the pressure fluid supply from the precharging source to the suction side of the return pump as a function of the pressure gradient in this connecting line. To this end, an electromagnetically operated on-off valve (23) with a hydraulically insertable throttle is used.

8 Claims, 2 Drawing Sheets

HYDRAULIC BRAKE SYSTEM WITH A PRECHARGING DEVICE

BACKGROUND OF THE INVENTION

The present invention relates to a hydraulic brake system with brake slip control and a device for active braking, including a master cylinder which is connected to a supply reservoir, at least one wheel brake which is connected to the master cylinder by way of a brake line, a return pump which is connected to the wheel brake by way of a first suction line and to a precharging device by way of a second suction line, wherein a means is arranged in the second suction line that controls the pressure fluid supply to the suction side of the return pump.

A brake system of this type is disclosed in German patent applciation No. 40 25 859, for example. The prior art brake system exhibits a front-axle/rear-axle brake circuit split-up, and one brake circuit is associated with a non-driven axle and the other brake circuit is associated with a driven axle. The brake circuit of the driven axle is equipped with a device for traction slip control. Traction slip control is an active braking mode because braking intervention is carried out without application of the brake pedal. Further ways of active braking are, for example, braking interventions for yaw torque control without participation of the driver.

In brake slip control operations, the prior art brake system operates according to the recirculation principle and includes a precharging pump for the return pump for traction slip control purposes. The precharging pump is connected with its suction side to the supply reservoir of the brake system and with its pressure side, by way of a hydraulically operated on-off valve, to the suction side of the return pump. When the supply pressure of the return pump reaches the maximum pressure which is provided in the brake system during traction slip control operations, the delivered pressure fluid flows through a pressure-limiting valve and propagates into the control line for the hydraulically operated on-off valve between the precharging pump and the return pump. In the further course of traction slip control, a precharging volume is not delivered to the return pump until the pressure in the control line has decreased to such an extent that the on-off valve reopens. The purpose of this provision is to prevent the delivery of unnecessary pressure fluid volume by the return pump. The objective is that the return pump produces pressure only when it is actually required. Thus, instead of discharging a superfluously delivered fluid volume by way of a pressure-relief valve into the supply reservoir of the brake system, the suction side of the return pump is shut off until fluid delivery is needed again.

Other possibilities of precharging a return pump, no matter whether it is of the self-priming or non-self-priming type, are provided by using an active vacuum brake force booster, an additional pressure accumulator or, for example, a precharging device between the supply reservoir and the master cylinder so that the passage through the master cylinder into the brake line is used to precharge the return pump when the brake pedal is not applied.

However, the return pump in all these constructions is greatly stressed by the precharging device in the active braking mode and is subjected to premature wear. Major leakages will then cause failure of the electric motors of the pumps in the extreme case. A leak-proof design of the electric motors would involve considerable effort and structure, however.

Therefore, an object of the present invention is to provide a hydraulic brake system of the above-mentioned type where the wear of the return pump is reduced.

SUMMARY OF THE INVENTION

This object is achieved by controlling the pressure fluid supply as a function of the pressure gradient in the second suction line of the return pump.

The principle of the present invention in active braking involves preventing from the very start the pressure on the suction side of the return pump from rising to an extent which might cause damage. Such prevention is effected by controlling the pressure fluid supply during precharging as a function of the pressure gradient between the precharging source and the suction side of the return pump. Thus, the supply pressure of the return pump is no more decisive for a reduction of the pressure fluid supply.

A solenoid valve with a hydraulically insertable throttle is especially appropriate to limit the pressure fluid flow to the suction side of the pump.

The throttle may be configured so that, when the solenoid valve opens, it stays effective as long as a pressure gradient prevails between the precharging source and the return pump. When the precharging action is terminated, as is the case, for example, after some time when an active brake force booster is used, the throttle can be switched to open so that a larger valve passage opens. Then it is possible to replenish pressure fluid in a self-priming return pump by way of a large opening cross-section of the valve.

The idea of the present invention will be explained in detail by way of the description of an embodiment of the present invention in two Figures.

DETAILED DESCRIPTION OF THE DRAWINGS

Figure 1:
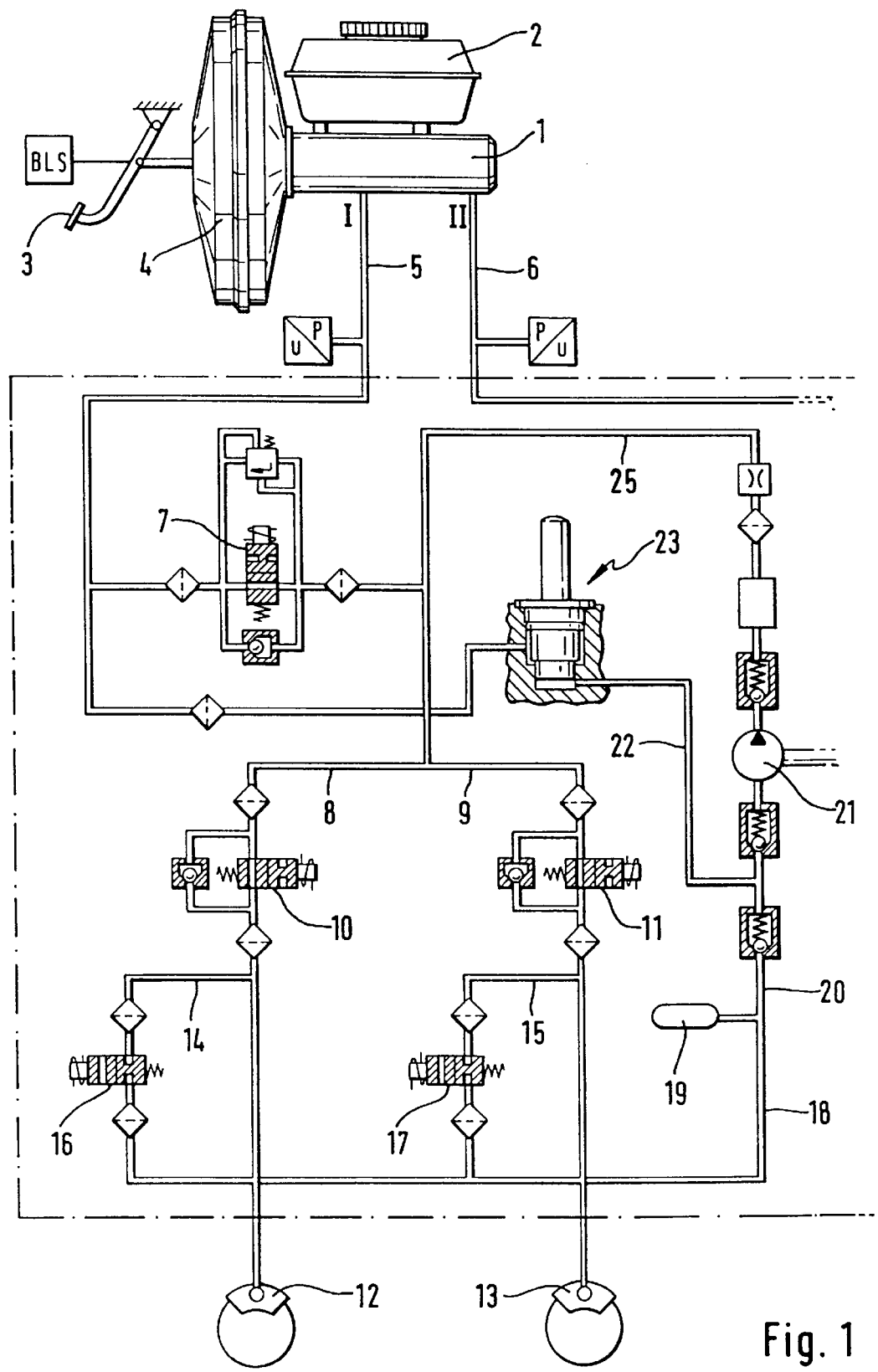
FIG. 1 is a view of a brake system of the present invention which includes an electromagnetically operated on-off valve in the connection between the precharging source and the return pump.

The brake system of the FIG. 1 embodiment comprises a master cylinder 1 which is connected to a supply reservoir 2 and operable by a brake pedal 3 by way of a vacuum brake force booster 4. The brake force booster 4 is designed as an active brake force booster. This means that the brake force booster 4, even without application of the brake pedal 3, is capable of displacing the actuating pistons of the master cylinder 1 by electric actuation, and of developing a defined pressure in the brake system. Two brake lines 5 and 6 extend from the master cylinder 1 to the respective brake circuits. Only brake circuit I is shown in detail, and brake circuit II can either be of identical design, or can be furnished only with an anti-lock device, for example, in a brake system with traction slip control and front-axle/rear-axle brake circuit split-up. Thus, brake circuit I extends from the master cylinder 1 to the wheel brakes 12 and 13 by way of brake line 5, a separating valve 7 and two brake branch lines 8 and 9 with one inlet valve 10 or 11 each. One return branch 14 or 15, respectively, extends from the wheel brakes 12 and 13, by way of one outlet valve 16 or 17, to a return line 18 which is connected to a low-pressure accumulator 19. The low-pressure accumulator 19 is connected to the suction side of a a self-priming return pump 21 by way of a first suction line 20. Pump 21 has a second suction line 22 into which an electromagnetically operated on-off valve 23 is inserted. The second suction line 22 is connected to the brake line 5 between the master cylinder 1 and the separating valve 7. A pressure line 25 connects the pressure side of the return pump 21 to the brake line 5 between the separating valve 7 and the inlet valves 10 and 11.

All valves remain in their illustrated position during normal braking operations, i.e., during pedal-operated braking without critical slip values or other critical factors related to driving dynamics. Pressure build-up in the wheel brakes 12 and 13 occurs through the brake line 5 and the brake branches 8 and 9. The pressure is decreased again on the same way.

During anti-lock control operations, the brake system operates according to the recirculation principle which is per se known. The electromagnetic on-off valve 23 remains closed, and the separating valve 7 remains open. Only the inlet valves 10 and 11 and the outlet valves 16 and 17 are operated in a known fashion for pressure control in the wheel brakes 12 and 13. The return pump 21 conducts the pressure fluid discharged into the low-pressure accumulator 19 through the pressure line 25 into the brake line 5 between the separating valve 7 and the inlet valves 10 and 11 again.

The separating valve 7 is closed in active braking operations, for example, traction slip control or active braking intervention for the purpose of yaw torque control. The brake force booster 4 actuates the master cylinder 1 so that fluid pressure in the second suction line 22 propagates through the brake line 5 up to the electromagnetically operated on-off valve 23.

Figure 2:
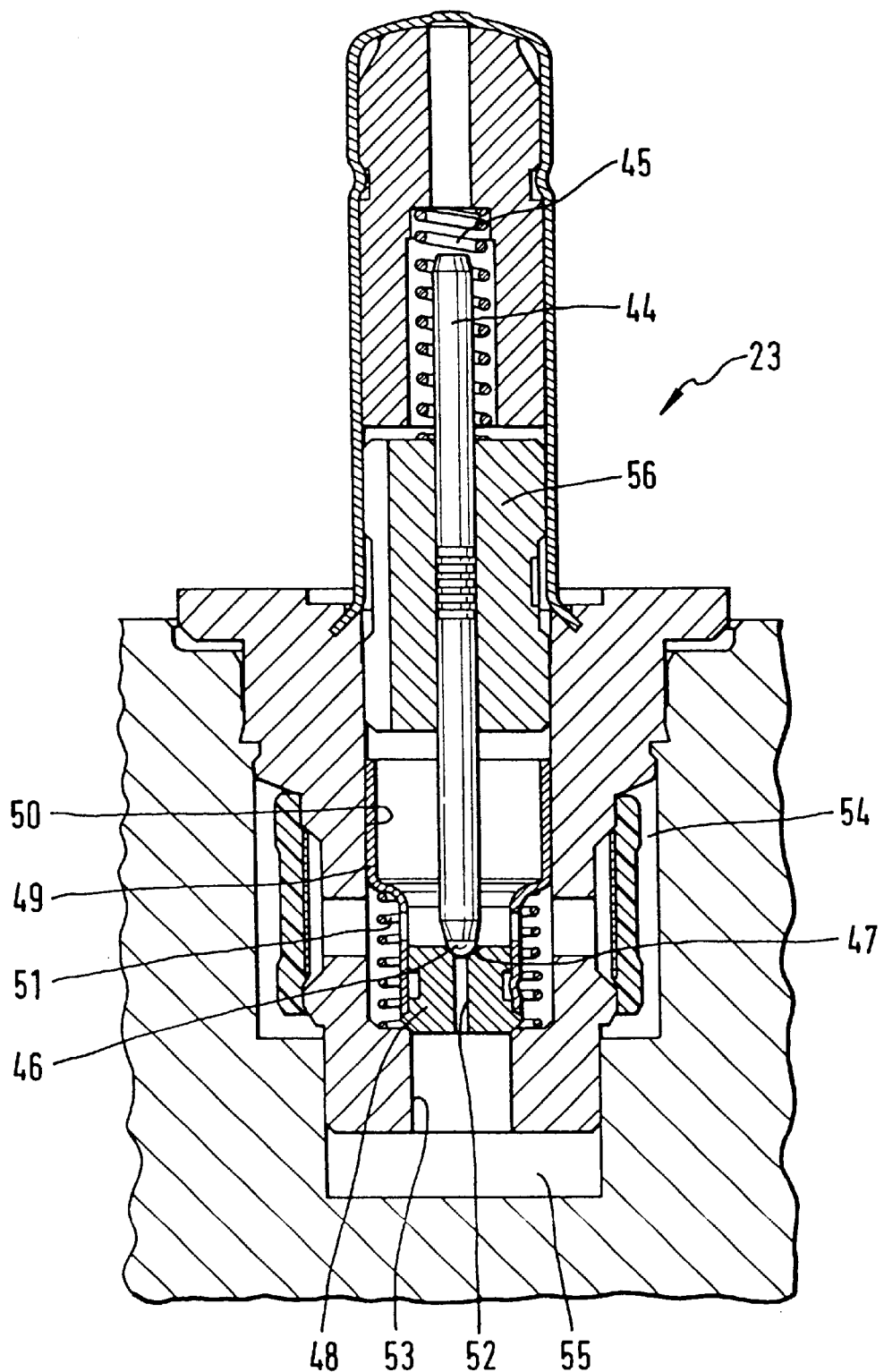
FIG. 2 is an enlarged view of the electromagnetically operated on-off valve of FIG. 1 with a hydraulically insertable throttle.

Valve 23, as is shown in the FIG. 2 embodiment, is configured as a normally closed valve, and the valve tappet 44 is acted upon by a compression spring 45 in the valve closing direction. The top of the valve tappet 44 includes a closure member 46 which cooperates with a valve seat 47 that is shaped on a valve member 48. The valve member 48 is impressed in a metallic sleeve 49 which is axially displaceable in bore 50. The metallic sleeve 59 is acted upon by a compression spring 51, which has a very weak design compared to compression spring 45, in the direction of the tappet 44. The valve member 48 has a central throttle 52 which is closed by abutment of the valve closure member 46 on the valve seat 47. In addition, valve member 48 is used as a closure member for another valve passage 53 which has a considerably larger cross-section compared to the throttle 52.

The inlet chamber 54 of the valve is arranged on the tappet side of the valve member 48, and outlet chamber 55 is arranged on the other side of the throttle 52 and the valve passage 53.

The electromagnetically operated on-off valve is appropriate especially for brake systems which are equipped with an exhaustible precharging source and a self-priming return pump.

The explanation is as follows: when precharging is carried out for active braking purposes, the magnetic armature which is rigidly secured to the tappet 44 is moved by a magnetic coil causing the closure member 46 to lift from its valve seat 47. However, due to the pressure gradient which prevails between the inlet chamber 44 and the outlet chamber 55, the valve member 48 remains in its illustrated position where it closes the valve passage 53 of large cross-section. Consequently, precharging may occur only via the throttle 52 so that no significant pressure is permitted to develop on the suction side of the return pump because the pump supplies the arriving pressure fluid further instantaneously. When, however, the precharging source is exhausted and, thus, the inlet chamber 54 unpressurized, the valve member 48 is shifted by the compression spring 51 against the closure member 48 of the tappet 44 again, with the result that the valve passage 53 opens. In this case, the return pump which continues with its aspiration can procure its pressure fluid via a considerably larger opening cross-section so that throttle losses are prevented in the further fluid aspiration.

In a permanently effective precharging source such as a precharging pump, which can also precharge a non-self-priming return pump, for example, a construction of this type is not necessary because a precharging pump of such a configuration could include, for example, a parallel-connected pressure-limiting valve which could prevent an excessive increase of the precharging pressure. Or a permanent throttle could be provided in the electrically operated on-off valve.

However, an electromagnetically operated on-off valve such as the one shown herein could offer protection against excessive pressure increase during precharging even if precharging is not effected by way of the brake line but, for example, by way of a separate precharging source which delivers fluid directly into the second suction line 22. Of course, the second suction line would then no longer be connected to the brake line 5.

What is claimed is:

1. A hydraulic brake system with brake slip control comprising:

a precharging device, a master cylinder which is connected to a supply reservoir, at least one wheel brake which is connected to the master cylinder by way of a brake line, a return pump which is connected to the at least one wheel brake by way of a first suction line and to the precharging device by way of a second suction line, and a valve arranged in the second suction line, said valve including a sleeve being axially displaceable in a bore of said valve, a valve member disposed within said sleeve and defining a central throttle and a valve seat, a tappet including a valve closure member at one end for cooperating with the valve seat of said valve member, a magnetic armature secured to said tappet, and a valve passage arranged between the central throttle and an outlet chamber, wherein the precharging device actuates the master cylinder such that a supply of fluid pressure in the second suction line is provided to the valve during active braking operations, and wherein the valve closure member of said tappet lifts away from the valve seat under influence of said magnetic armature and said sleeve remains stationary while said valve member abuts said valve passage due to a pressure gradient between an inlet chamber and the outlet chamber such that pressure fluid travels through said valve only by way of the central throttle, and wherein said sleeve moves under influence of a compression spring and not under influence of said magnetic armature such that the valve member abuts the valve closure member of said tappet due to a pressure decrease in the inlet chamber when the supply of pressure fluid is exhausted in the second suction line such that pressure fluid travels through said valve only by way of said valve passage.

2. A brake system as claimed in claim 1, wherein the tappet abuts the valve seat when said tappet is no longer influenced by said magnetic armature.

3. A method of braking, comprising the steps of:

actuating a precharging device to develop a pressure gradient in a suction line of a return pump;

actuating a master cylinder such that a supply of fluid pressure in the second suction line is provided to the electromagnetically operated on-off valve during active braking operations;

actuating a tappet in a valve in the suction line under influence of a magnetic armature which opens a throttle with a first cross-section due to a pressure gradient between an inlet chamber and an outlet chamber of said valve such that pressure fluid travels through said valve only by way of the throttle; and actuating a sleeve in the valve under influence of a compression spring and not under influence of the magnetic armature which opens a valve passage with a second cross-section due to a pressure decrease in the inlet chamber when the supply of pressure fluid is exhausted in the second suction line such that pressure fluid travels through said valve only by way of the valve passage.

4. A hydraulic brake system with brake slip control comprising:

a master cylinder which is connected to a supply reservoir, a precharging device configured as an active booster connected upstream of the master cylinder, at least one wheel brake which is connected to the master cylinder by way of a brake line, a return pump which is connected to the at least one wheel brake by way of a first suction line and to the precharging device by way of a second suction line, and an electromagnetically operated on-off valve arranged in the second suction line, wherein the precharging device actuates the master cylinder such that a supply of fluid pressure in the second suction line is provided to the electromagnetically operated on-off valve during active braking operations, the electromagnetically operated on-off valve controlling the supply of pressure fluid from the precharging device to the suction side of the return pump as a function of a pressure gradient between an inlet chamber and an outlet chamber of the electromagnetically operated on-off valve such that the supply of pressure fluid is permitted through the electromagnetically operated on-off valve only by way of a central throttle when the supply of pressure fluid is available from the precharging device and only by way of a valve passage having a larger cross section than said throttle when the supply of pressure fluid is exhausted.

5. The hydraulic brake system as claimed in claim 4, wherein said electromagnetically operated on-off valve comprises a sleeve being axially displaceable in a bore of said valve, a valve member disposed within said sleeve and defining the central throttle and a valve seat, a tappet including a valve closure member at one end for cooperating with the valve seat of said valve member, a magnetic armature secured to said tappet, and the valve passage arranged between the central throttle and an outlet chamber.

6. The hydraulic brake system as claimed in claim 5, wherein the valve closure member of said tappet lifts away from the valve seat under influence of said magnetic armature and said sleeve remains stationary while said valve member abuts said valve passage due to a pressure gradient between an inlet chamber and the outlet chamber such that pressure fluid travels through said valve only by way of the central throttle.

7. The hydraulic brake system as claimed in claim 6, wherein said sleeve moves under influence of a compression spring and not under influence of the magnetic armature such that said valve member abuts the valve closure member of said tappet due to a pressure decrease in the inlet chamber such that pressure fluid travels through said valve only by way of said valve passage.

8. A brake system as claimed in claim 5, wherein the tappet abuts the valve seat when said tappet is no longer influenced by said magnetic armature.

* * * * *